June 14, 1932. H. C. BOSTWICK 1,862,655
TIRE CORE
Filed Nov. 24, 1930

Inventor
Henry C. Bostwick,
By Robert M. Pierson,
Attorney

Patented June 14, 1932

1,862,655

UNITED STATES PATENT OFFICE

HENRY C. BOSTWICK, OF AKRON, OHIO, ASSIGNOR TO THE AKRON STANDARD MOLD COMPANY, OF AKRON, OHIO, A CORPORATION OF OHIO

TIRE CORE

Application filed November 24, 1930. Serial No. 497,662.

This invention relates to segmental cores or mandrels for building pneumatic tire casings, and it has for its object to provide an improved mode of detachably connecting the core sections or segments.

In building tire casings substantially in their ultimate shape on a core as distinguished from the flat-band drum method, segmental cores in which a base segment having adjoining segments hingedly or otherwise connected thereto, and mounted upon a chuck having provision for withdrawing a key segment to permit the collapse of the core, have come into use, and my invention applies to cores for use with such chucks and particularly with a novel type of chuck as disclosed in my copending application Ser. No. 499,309, filed Dec. 1, 1930, as well as to cores adapted for independent use. In making the larger sizes of balloon and heavy-duty tires, particularly those to be used on wheels of small diameter, some of the core segments must be individually removed from the casing, after completion of the latter, and it becomes necessary to provide suitable means for detachably connecting adjacent sections. External locking devices are unsatisfactory, and my present invention provides an improved internal locking means, adapted to be operated from the inner periphery of the core, which adequately fills the requirements of such a situation and is also well adapted for use generally in connection with segmental cores.

Of the accompanying drawing, Fig. 1 is a side elevation, partly in section, showing an annular segmental tire-building core provided with a preferred embodiment of my invention.

Figure 1:
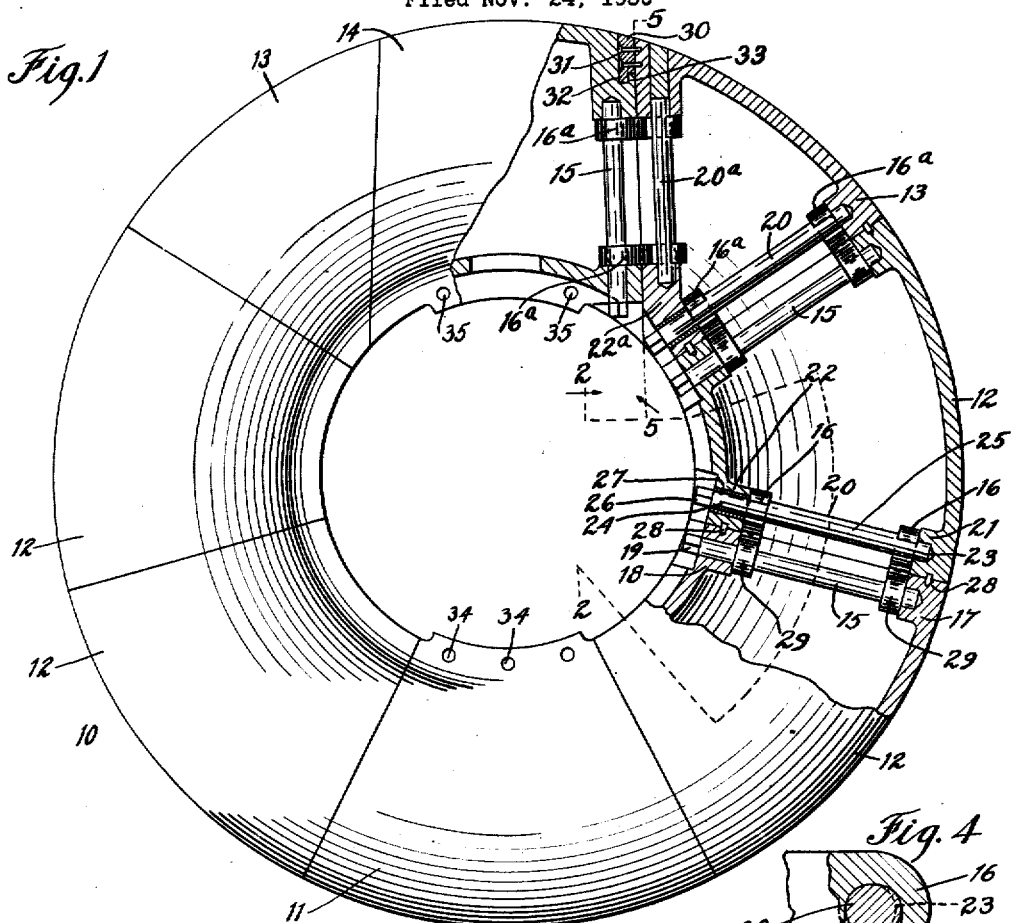
Figure 2:
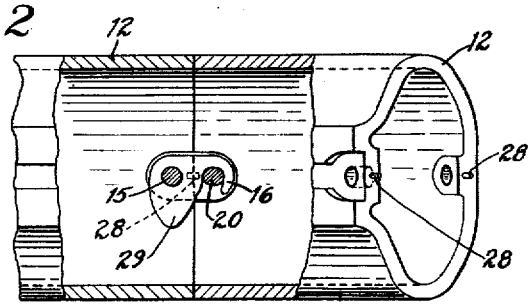
Fig. 2 is an edge view and section from the plane 2—2 of Fig. 1, omitting one of the locking members.

Referring to the drawing, 10 indicates as a whole the toric core or mandrel, tire-shaped in cross section and composed of a sufficient number of segments 11, 12, 13, 14, in this instance eight, to provide the necessary facility of removal from a tire casing. Of said segments, 14 is a key segment abutting the two adjoining segments 13 along semi-tangent or semi-radial division planes which diverge slightly in an inward direction, whereas the remaining segments abut each other along radial planes. The several segments are cast hollow, preferably of a relatively light metal such as an aluminum alloy.

For detachably connecting the abutting ends of adjoining segments I provide internal locking or latching devices which for any one of the radial joints comprises an approximately radial rock-shaft 15 pivoted to turn in bearings drilled in the outer and inner peripheral walls of one of the segments, such as 12, close to its joint face, and provided with a pair of hooked locking dogs 16 mounted adjacent to the bearing bosses 17, 18, respectively near the outer and inner peripheries of the segment. For a shallower core, one such dog, located approximately midway of the depth of the core, might suffice. The end of shaft 15, projecting inwardly at the inner periphery of the core, is formed with a squared portion 19 for receiving a socket wrench to turn said shaft The complemental locking member, mounted within the adjacent core section, such as 12, parallel with the shaft 15, is a keeper rod 20 supported by inner and outer segment-wall bosses 21, 22. This rod could be fixed or non-turning, but I prefer to form it with end journals 23, 24, an intermediate eccentric portion 25 for engaging the hook portions of the locking dogs 16, and a squared portion 26 projecting at the inner periphery for turning the rod in order to tighten or loosen the lock when said rod is in coupled relation with the hooks. A bearing bushing 27 fitting a hole in the inner segment wall permits insertion of the tightening rod 20 during manufacture.

Proper alignment of the core segments at their joints is provided by radially-spaced dowels 28 in one of the segments, fitting in dowel holes in the adjacent segment.

Figure 3:
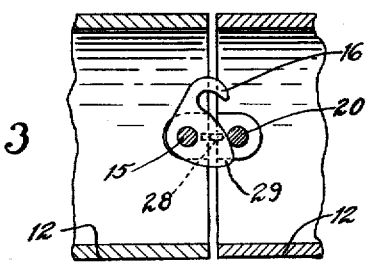
Fig. 3 is a sectional view of abutting core segments showing the reverse or separating action of the core lock.
Figure 4:
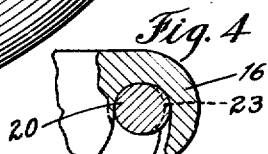
Fig. 4 is an enlarged detail sectional view of one of the lock tighteners.
Figure 5:
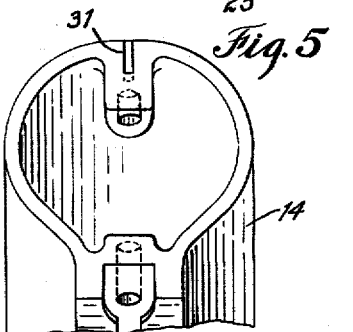
Fig. 5 is an end view of the key segment from the plane 5—5 of Fig. 1, omitting the lock member.

For breaking the joint or initiating the separation of its members when it is desired to disconnect the segments, I form the hub of each of the locking dogs 16 with a cam 29 which, by a continuation of the backward or reverse turning movement of shaft 15 to disengage the hooked end of said dog from the keeper rod 20, exerts a thrust against said rod, circumferentially of the core, to separate the segments as indicated in Fig. 3.

Locking, aligning and separating devices such as above described are illustrated at two of the radial joints in Fig. 1 and it will be understood that the other radial joints are or may be similarly equipped, although it would be possible to provide different types of locks at different joints.

For obtaining registration of the key segment 14 with the two adjoining segments, I provide at each of the joints, near the outer periphery, a block 30 attached to the segment 13 and adapted to enter a slot 31 in the segment 14, said block having a retaining projection 32 adapted to overlap a complemental projection 33 on the key segment 14 when the latter is moved radially outward into place, and thus to retain said key segment against circumferential separation from the segment 13.

As a further means of locking the key segment 14 to its neighbors to prevent their circumferential separation and also to maintain the key segment radially in place I may employ locking devices such as shown in Fig. 1, generally similar to those at the radial joints, namely a semi-radial rock-shaft 15 on the segment 14, having internal hooked locking dogs 16ª for engaging a parallel, fixed keeper rod 20ª on the segment 13, the dog at the inner periphery overlying the boss 22ª to effect the radial locking. In this case it is unnecessary to form the keeper rod as a rotary tightening device or to provide joint-opening cams on the locking dogs. If desired, any other suitable locking devices may be used for these joints.

A core of this construction may be mounted upon any suitable form of ordinary expanding chuck, and when a tire casing has been built thereon, said core and casing may be removed from the chuck and placed together in a vulcanizing mold and the casing vulcanized with the core therein; after which, upon removal from the mold, the locks of the key segment 14 are first disconnected to permit said section to be withdrawn inwardly into the central opening of the tire, and removed from the tire, whereupon the remaining segments are successively uncoupled and removed after turning the eccentric keeper rod 20 on each lock to loosen it from the hooked dogs 16 by a socket wrench applied to its squared inner end, and then rotating the shaft 15 in a similar manner to retract its dogs from the keeper rod and to separate the segments through the action of the cams 29.

Alternatively, the middle segment 11, opposite the key segment 14, may be permanently attached, by bolts passing through holes 34, to any suitable rotary chuck of a tire-building machine, such as the one described in my aforesaid application Serial No. 499,309 filed Dec. 1, 1930, and the key segment 14 may be permanently attached, by means of bolts passing through holes 35, to the mechanism provided on the chuck for projecting and withdrawing said key segment. In that case the pivoted locking devices above described for detachably connecting the key segment 14 to the adjoining segments 13 may be dispensed with as provided in said application.

From the foregoing it will be evident that I have provided a simple and easily-operated locking device, controllable from the inner periphery of the segmental core, for detachably connecting its segments, and also an effective joint breaker, said devices being internally mounted and leaving a clean exterior.

The described embodiment could be variously modified without departing from the scope of the invention as defined in the claims.

I claim:

1. An annular tire core comprising adjoining hollow segments, and locking means including a keeper member in one segment, a rock-shaft mounted on the adjacent segment for turning from the inner periphery of the core, and a keeper-engaging swingable hook member fixed on said shaft within said adjacent segment for detachably connecting said segments against circumferential separation.

2. An annular tire core comprising adjoining radially divided segments, and a hook member on one segment coacting with a complemental member on the other segment and mounted to turn on an approximately radial fixed axis, for detachably connecting said segments against circumferential separation.

3. An annular tire core comprising adjoining hollow segments, and internal locking means for detachably connecting said segments adjacent their inner and outer peripheries, said means including a pair of radially-spaced pivoted hooks on one of said segments, rigidly connected for concurrent operation, and coacting keeper means on the other segment.

4. An annular tire core comprising adjoining hollow segments, a rock-shaft on one of said segments, accessible for turning from the inner periphery of the core and having a hooked locking dog fixed thereon, and a parallel keeper rod on the other segment.

5. An annular tire core comprising adjoining hollow segments, an approximately radial rock-shaft pivoted on one of said segments and having two hooked locking dogs adjacent the ends of said shaft, and a parallel keeper rod on the other segment, coacting with said dogs at the inner and outer peripheries of the segments.

6. An annular tire core comprising adjoining segments, and a lock detachably connecting said segments and including a locking member adapted, by a reverse movement, to separate the segments.

7. An annular core comprising adjoining segments, dowel means for registering them, and a lock for detachably connecting the segments, said lock being adapted, by a continuation of its unlocking action, to break the dowel joint.

8. An annular core comprising adjoining segments, a pivoted member on one of them coacting with a complemental member on the other for detachably connecting the segments, said pivoted member having a cam adapted, by reverse rotation of the member, to circumferentially separate the segments.

In witness whereof I have hereunto set my hand this 21st day of November, 1930.

HENRY C. BOSTWICK.